United States Patent
Lovett et al.

(10) Patent No.: US 10,420,284 B2
(45) Date of Patent: Sep. 24, 2019

(54) SLIP CONTROLLER FOR SIDE CONVEYORS OF A DRAPER HARVESTING HEAD

(71) Applicant: Deere & Company, Moline, IL (US)

(72) Inventors: Benjamin M. Lovett, Colona, IL (US); Bryan R. Yanke, Eldridge, IA (US); Austin M. Laugen, Davenport, IA (US); Duane M. Bomleny, Geneseo, IL (US)

(73) Assignee: Deere & Company, One John Deere Place, Moline, IL (US)

( * ) Notice: Subject to any disclaimer, the term of this patent is extended or adjusted under 35 U.S.C. 154(b) by 170 days.

(21) Appl. No.: 15/799,105

(22) Filed: Oct. 31, 2017

(65) Prior Publication Data
US 2019/0124844 A1    May 2, 2019

(51) Int. Cl.
*A01D 61/02* (2006.01)
*A01D 41/127* (2006.01)
(Continued)

(52) U.S. Cl.
CPC ......... *A01D 61/02* (2013.01); *A01D 41/1271* (2013.01); *A01D 41/1274* (2013.01);
(Continued)

(58) Field of Classification Search
CPC .............. A01D 41/1474; A01D 41/142; A01D 41/1271; A01D 41/141; A01D 41/14;
(Continued)

(56) References Cited

U.S. PATENT DOCUMENTS 2,608,041 A * 8/1952 Schoenrock ......... A01D 61/008
    198/518
5,855,108 A * 1/1999 Salz .................... A01D 41/1274
    56/10.2 G
(Continued)

FOREIGN PATENT DOCUMENTS

DE    102013110551 A1    3/2015
DE    102016202628 A1    8/2017
(Continued)

OTHER PUBLICATIONS

Search Report issued in counterpart application EP18202597.3, dated Feb. 19, 2019 (6 pages).

*Primary Examiner* — Robert E Pezzuto

(57) ABSTRACT

In a draper harvesting head having a frame, a left side conveyor supported on the frame, a right side conveyor supported on the frame, a central conveyor supported on the frame and disposed between the left side conveyor and the right side conveyor, and a reciprocating knife fixed to the front of the frame and extending laterally across the frame, a method of controlling slippage between an endless conveyor belt of one of the left side conveyor and the right side conveyor and a crop mat carried on the endless conveyor belt is provided, including determining a speed of the endless conveyor belt and a speed of the crop mat; comparing a difference in the speed of the endless conveyor belt and the speed of the crop mat with a first threshold speed difference; and changing the speed of the endless conveyor belt based upon the step of comparing.

9 Claims, 4 Drawing Sheets

(51) Int. Cl.
  *A01D 41/14* (2006.01)
  *A01D 57/20* (2006.01)
  *A01D 61/00* (2006.01)
  *A01D 34/13* (2006.01)

(52) U.S. Cl.
  CPC .............. *A01D 34/13* (2013.01); *A01D 41/14* (2013.01); *A01D 57/20* (2013.01); *A01D 61/002* (2013.01)

(58) Field of Classification Search
  CPC ...... A01D 57/20; A01D 61/02; A01D 61/068; A01D 75/182; A01F 12/56; A01F 12/58
  USPC .... 56/10.2 G, 10.2 J, 10.2 R, 10.3; 198/518, 198/611, 837; 414/530; 701/50
  See application file for complete search history.

(56) References Cited

U.S. PATENT DOCUMENTS

| | | | |
|---|---|---|---|
| 6,119,442 A | | 9/2000 | Hale |
| 8,527,157 B2 * | | 9/2013 | Imhof .................... A01D 57/20 701/50 |
| 9,320,197 B2 | | 4/2016 | Peters et al. |
| 9,795,081 B2 * | | 10/2017 | Middelberg ....... A01D 41/1274 |
| 2007/0251202 A1 * | | 11/2007 | Coers .................... A01D 57/20 56/181 |
| 2016/0366821 A1 | | 12/2016 | Good |

FOREIGN PATENT DOCUMENTS

| | | | |
|---|---|---|---|
| EP | 2382854 A1 | 11/2011 | |
| EP | 3286999 A1 | 2/2018 | |

* cited by examiner

SLIP CONTROLLER FOR SIDE CONVEYORS OF A DRAPER HARVESTING HEAD

FIELD OF THE INVENTION

This invention relates to agricultural combines and harvesting heads. In particular it relates to conveyor belts for paper harvesting heads. More particularly, it relates to slippage control for side draper belts.

BACKGROUND OF THE INVENTION

Agricultural harvesters, such as agricultural combines, travel through fields of agricultural crops harvesting the crop with a harvesting head. The harvesting head cuts the crops from the ground, carries the cut crop material to a central region of the harvesting head with conveyors, and sends the cut crop material rearward through a hole in the frame of the harvesting head. The agricultural combine receives the cut crop material in a feederhouse. Then it threshes, separates, and cleans the cut crop material. The crop residue (material other than grain or "MOG") is either deposited in the field as a windrow, or is broadcast either side of the agricultural combine itself.

All of these operations require the smooth flow of cut crop material. In order to provide the smooth flow, the speed of conveyors, the spacing of various machine components, even the speed of the agricultural combine through the field must be controlled and.

One problem relates to draper harvesting heads. Draper heads have a frame that extends laterally, perpendicular to the direction of travel of the combine over the ground. To the leading edge of the draper head a reciprocating knife is fixed that severs the crop plants close to their roots. The crop plants fall backward onto endless belt conveyors. Two of these endless belt conveyors are disposed on either side of the draper head frame and convey the crop material inward toward a central region of the draper head. Another endless belt conveyor is located between both the side conveyors at the middle of the paper head. This center conveyor receives the cut crop material from both the side conveyors and drags the cut crop material rearward, through a hole in the frame of the draper head, where it is presented to the agricultural combine for further processing.

The thick mat of cut crop material supported on the two side conveyors does not travel at the same speed as the belt that carries it. There typically is a difference between the speed of the mats of cut crop material and the speed of the endless belts of the side conveyors that support and convey the mats.

If the speed of the endless belts of the side conveyors is too high there will be a large difference in speed between the mats and the endless belts that carry them (this is called "slippage" herein). The endless belts will batter the mat of cut crop material due to the high slippage, causing grain to fall out of the mat and onto the ground.

If the speed of the endless belts is too low, the slippage may be reduced to zero and the mat of cut crop material will become too thick. It may jam the draper head. Thus, operating the two side conveyors too fast poses a problem, and operating them too slow also poses a problem. Some slippage is good. Too much slippage is bad.

In order to control the slippage, a system must be able to measure the slippage. To measure the slippage, the system must be able to measure the difference in relative velocity of (1) the crop mat carried on top of the belt, and (2) the endless belt itself. In order to determine the slippage between the crop mat and the endless belt, both the speed of the crop mat and the speed of the endless belt which carries it should be determined and compared.

There is general prior art disclosing cameras to detect characteristics of crop plants (either crop plants standing in the field, cut crop on a harvesting head or cut crop inside the combine) and using those characteristics to control the mechanisms of the agricultural harvesting head or the combine.

U.S. Pat. No. 9,320,197 B2, for example, discloses a camera system for imaging unharvested crop standing in the field in front of harvesting head and using those images to control the speed of a conveyor carrying cut crop.

DE 102016202628 A1, for example, discloses using a camera located above the front of an auger platform to monitor the crop flow within the auger platform and (among other things) to change the rotational speed of the transverse conveyor screw. An auger platform is a harvesting head that uses an elongate helical auger (the "transverse conveyor screw") instead of conveyor belts to carry the crop inwardly toward the central region of the harvesting head.

U.S. Pat. No. 6,119,442 A, for example, discloses using a machine vision apparatus to generate images of crop material being processed by the combine, generating an image signal of the crop material, transmitting the image signal to a DPU, comparing the image signal to a set point within the DPU, and generating an output signal corresponding to the difference between the setpoint and the image signal, and transmitting the output signal to an actuator configured to change a combine setting.

US 20160366821 A1, for example, discloses an imaging system including cameras mounted on a feederhouse that image crop material between the cutting portion of an agricultural harvesting head and the feederhouse of the agricultural combine itself. A controller determines the cross-sectional area of the cut crop material and adjusts one or more machine parameters autonomously.

None of these references disclose the problem of (or benefit for) regulating cut crop slippage on the side draper belts of a draper header. None of them disclose determining cut crop slippage.

What is needed is a method for controlling the amount of slippage between a cut crop mat and the endless belts that carry the cut crop mat to a central region of the draper head.

It is an object of this invention to provide such a method.

SUMMARY OF THE INVENTION

In accordance with a first aspect of the invention, a method of controlling slippage between an endless conveyor belt and a crop mat supported on the endless conveyor belt is provided for a draper harvesting head having a frame, a left side conveyor supported on the frame, a right side conveyor supported on the frame, a central conveyor supported on the frame and disposed between the left side conveyor and the right side conveyor, and a reciprocating knife fixed to the front of the frame and extending laterally across the frame, wherein the method of controlling slippage between an endless conveyor belt of one of the left side conveyor and the right side conveyor and a crop mat carried on the endless conveyor belt, the method comprising the steps of: electronically determining a speed of the endless conveyor belt; electronically determining a speed of the crop mat; electronically comparing a difference in the speed of the endless conveyor belt and the speed of the crop mat with a first threshold speed difference; and electronically changing the speed of the endless conveyor belt based upon the step of comparing.

The draper harvesting head may have a speed sensor coupled to the endless conveyor belt to provide a signal indicative of the speed of the endless conveyor belt, and the step of electronically determining a speed of the endless conveyor belt may include a step of electronically reading the speed sensor.

The draper harvesting head may have a camera disposed to view the crop mat, and the step of electronically determining a speed of the crop mat may comprise the step of imaging the crop mat with the camera.

The step of electronically determining a speed of the crop mat May further comprise the step of calculating the speed of the crop mat from a sequence of images taken by the camera.

The draper harvesting head may have a motor drivingly coupled to the endless conveyor belt, and the step of electronically changing the speed of the endless conveyor belt may comprise a step of electronically changing the speed of the motor.

The method may further comprise the step of electronically comparing the difference in the speed of the endless conveyor belt and the speed of the crop mat with a second threshold speed difference.

The first threshold speed difference may be less than the second threshold speed difference.

The step of electronically changing the speed of the endless conveyor belt based upon the step of comparing may comprise the step of electronically increasing the speed of the endless conveyor belt when the difference in the speed of the endless conveyor belt and the speed of the crop mat is below the first threshold speed difference.

The step of electronically changing the speed of the endless conveyor belt based upon the step of comparing may comprise the step of electronically decreasing the speed of the endless conveyor belt when the difference in the speed of the endless conveyor belt and the speed of the crop mat is above the first threshold speed difference.

DETAILED DESCRIPTION OF THE PREFERRED EMBODIMENTS

Figure 1:
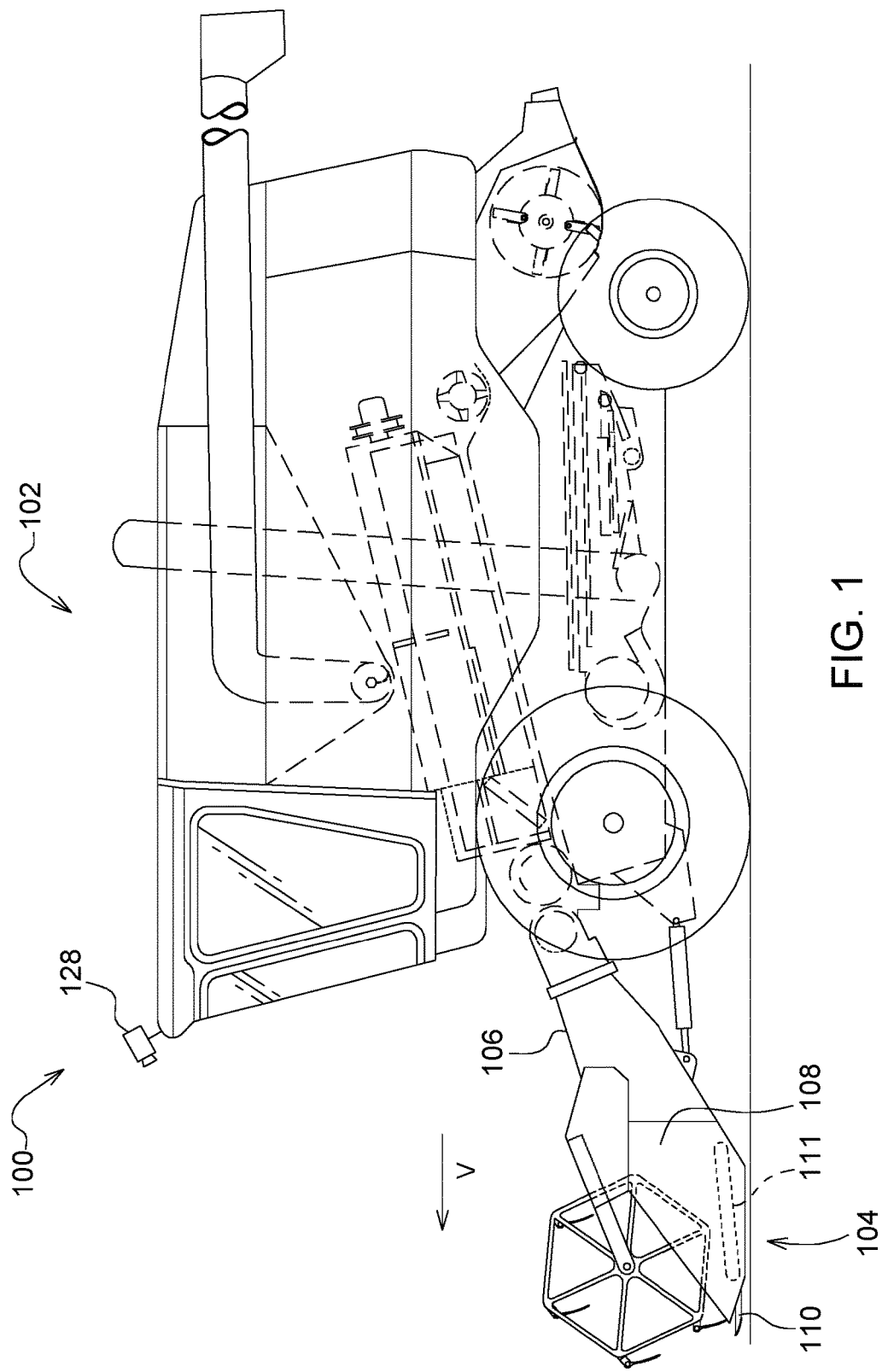
FIG. 1 is a side view of an agricultural combine and harvesting head in accordance with the present invention.
Figure 2:
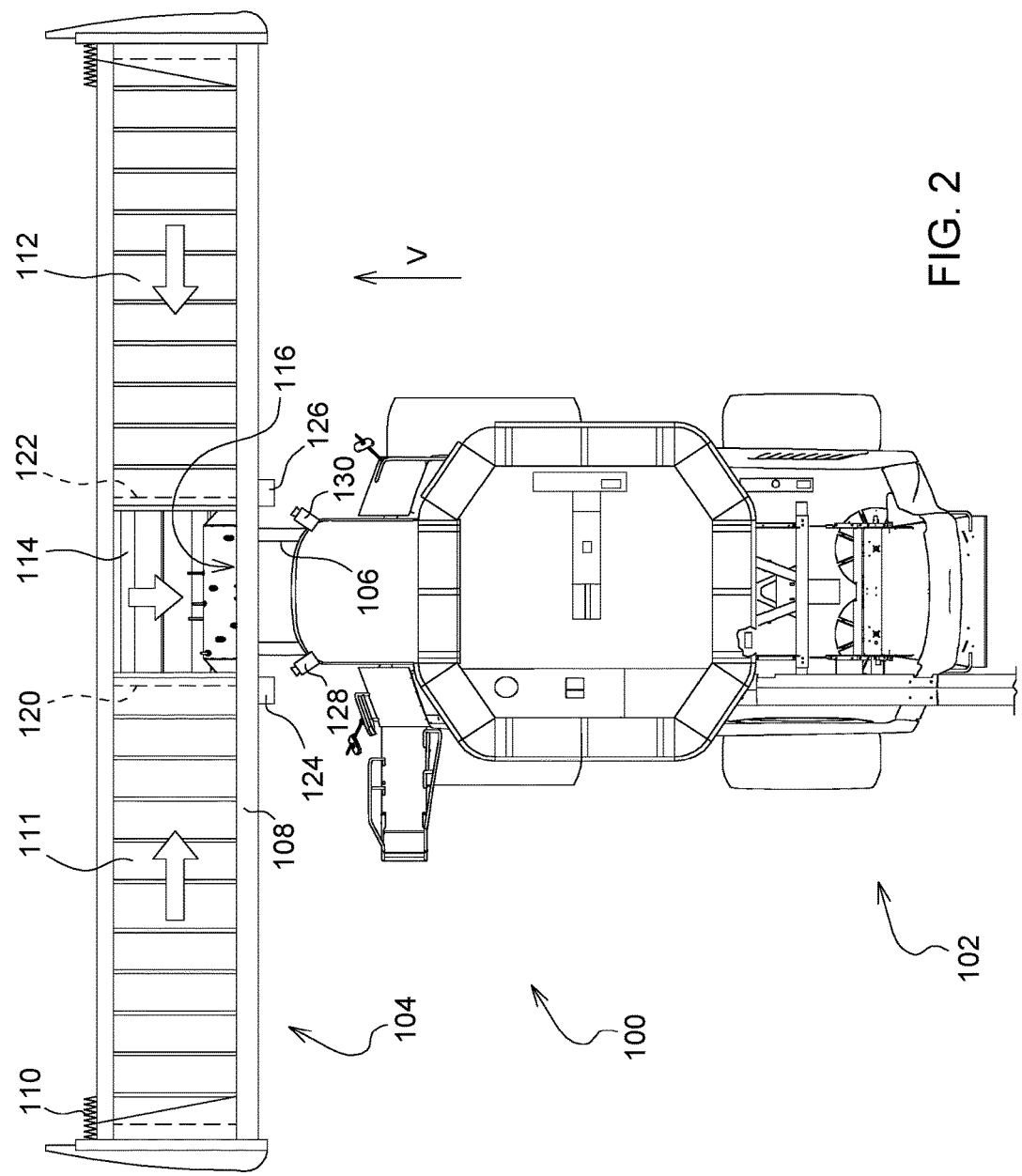
FIG. 2 is a plan view of the combine and harvesting head of FIG. 1.
Figure 3:
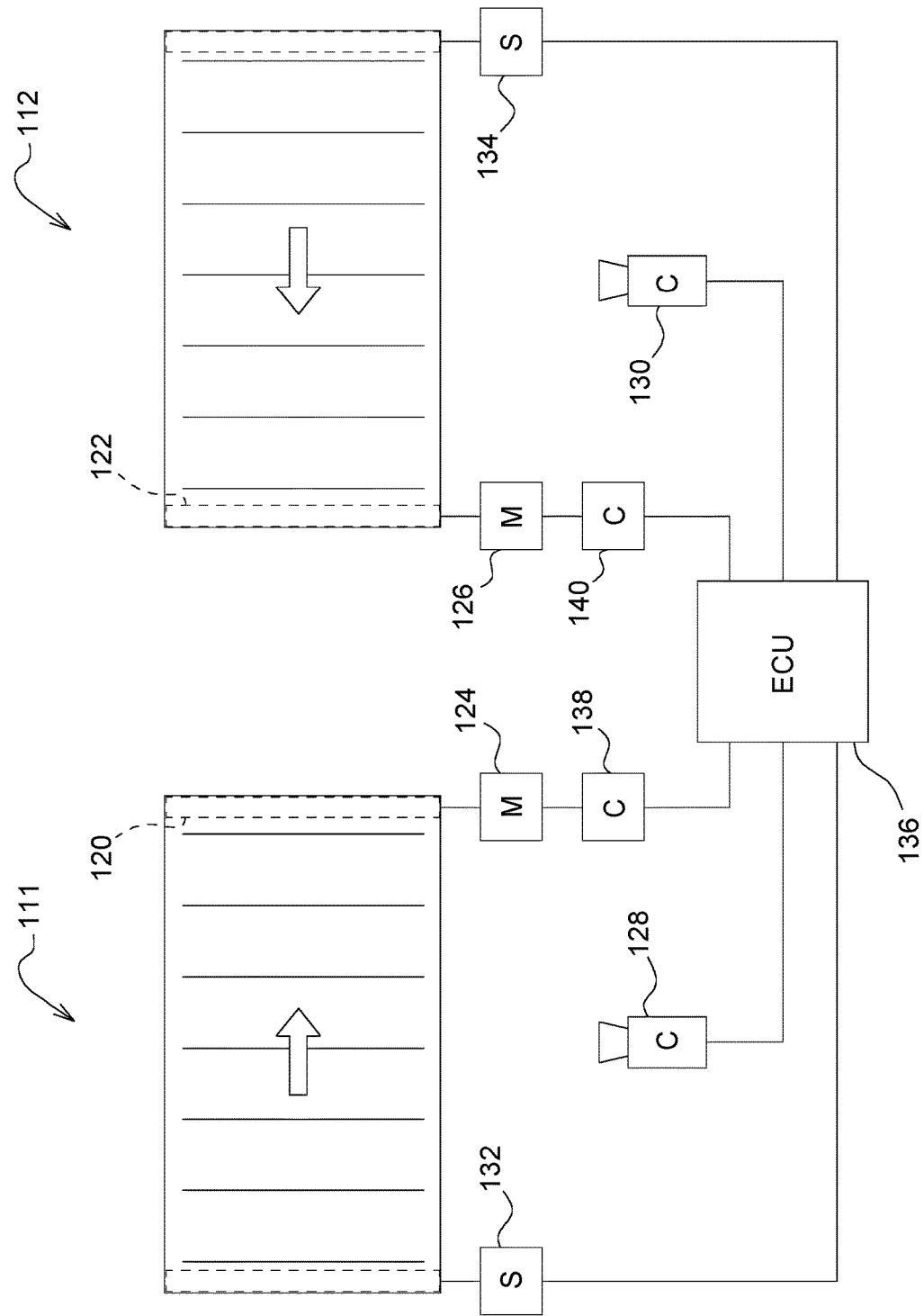
FIG. 3 shows a control system for regulating the slippage between a crop mat and an endless belts supporting the crop mat.

In FIGS. 1 and 2 an agricultural harvester 100 comprises a self-propelled agricultural combine 102 and an agricultural harvesting head 104. A feederhouse 106 extends forward from the front of the agricultural combine 102 and supports the agricultural harvesting head 104 for travel through the field harvesting crops. The agricultural harvesting head 104 includes a frame 108 that extends perpendicular to the direction of travel "V" of the agricultural harvester as it travels to the field harvesting crops. A reciprocating knife 110 is fixed to a leading edge of the frame 108 to sever the crop plants in the field at their roots. A left side conveyor 111 and a right side conveyor 112 are disposed on left side and the right side of the agricultural harvesting head 104 to carry the cut crop material laterally inwardly to a central region of the agricultural harvesting head 104 as indicated by the heroes superimposed on these conveyors. A central conveyor 114 is located between the left side conveyor 111 and the right side conveyor 112 to receive cut crop material from these two conveyors and convey the material rearward through a hole 116 in the rear wall of the agricultural harvesting head 104.

The left side conveyor 111, the right side conveyor 112, and the central conveyor 114 are endless belt conveyors. They are all supported on a corresponding pair of rollers, including an idler roller, and a drive roller. The left drive roller 120 for the left side conveyor 111 and the right drive roller 122 for the right side conveyor 112 are located adjacent to the central conveyor 114. The left drive roller 120 is coupled to and is driven by a motor 124. The right drive roller 122 is coupled to and is driven by a motor 126. The motors may be electric, hydraulic, or pneumatic. The motors are rotary motors.

A camera 128 is mounted on the agricultural harvester 100 such that a crop mat traveling on the left side conveyor 111 is in the field of view of the camera 128. A camera 130 is mounted on the agricultural harvester 100 such that a crop mat traveling on the right side conveyor 112 is in the field of view of the camera 130.

A speed sensor 132 is coupled to the left side conveyor 111 to provide a signal indicative of the speed of the left side conveyor 111. A speed sensor 134 is coupled to the right side conveyor 112 to provide a signal indicative of the speed of the right side conveyor 112.

A motor speed controller 138 is coupled to the motor 124 to control the speed of the motor 124. A motor speed controller 140 is coupled to the motor 126 to control the speed of the motor 126. These motor speed controllers may be electric, hydraulic, pneumatic or combination of the three. Typically, the motor speed controllers will comprise hydraulic valves and electronic components, such as driver circuits and electrical coils to regulate flow of hydraulic fluid to the motors if the motors are hydraulic motors. If the motors are electric, the motor speed controllers will comprise electronic components, such as driver circuits.

An ECU 136 is coupled to the speed sensor 132, the speed sensor 134, the motor speed controller 138, the motor speed controller 140, the camera 128, and the camera 130.

The ECU 136 may comprise a single digital microcontroller (with associated RAM and ROM) that is programmed to perform the operations described herein. Alternatively, the ECU 136 may comprise two or more digital microcontrollers connected in a network over serial or parallel communications buses, wherein each digital microcontroller provides a subset of the operations described herein and wherein the digital microcontrollers collectively perform all the operations described herein.

The ECU 136 receives signals from the speed sensors 132, 134 that indicate the speed of the endless belt of the left side conveyor 111 and the endless belt of the right side conveyor 112, respectively.

The ECU 136 transmits signals to the motor speed controllers 138, 140 that control the speed of the motors that drive the left side conveyor 111 and the right side conveyor 112, respectively.

The ECU 136 receives signals from the cameras 128 and 130 that indicate the speed of the crop mat on the left side conveyor 111 and the right side conveyor 112, respectively. The signals provided by the cameras 128 and 130 may be raw image signals that are processed by the ECU 136 to provide one or more numeric values indicative of the speed of the crop mats. Alternatively, the cameras 128 and 130 may be configured to perform such image processing and transmit a numeric value indicative of the speed of the crop mats to the ECU 136. In either case, the signals provided by the cameras 128 and 130 to the ECU 136 are indicative of the speed of the crop mat on the left side conveyor 111 and the right side conveyor 112, respectively.

Figure 4:
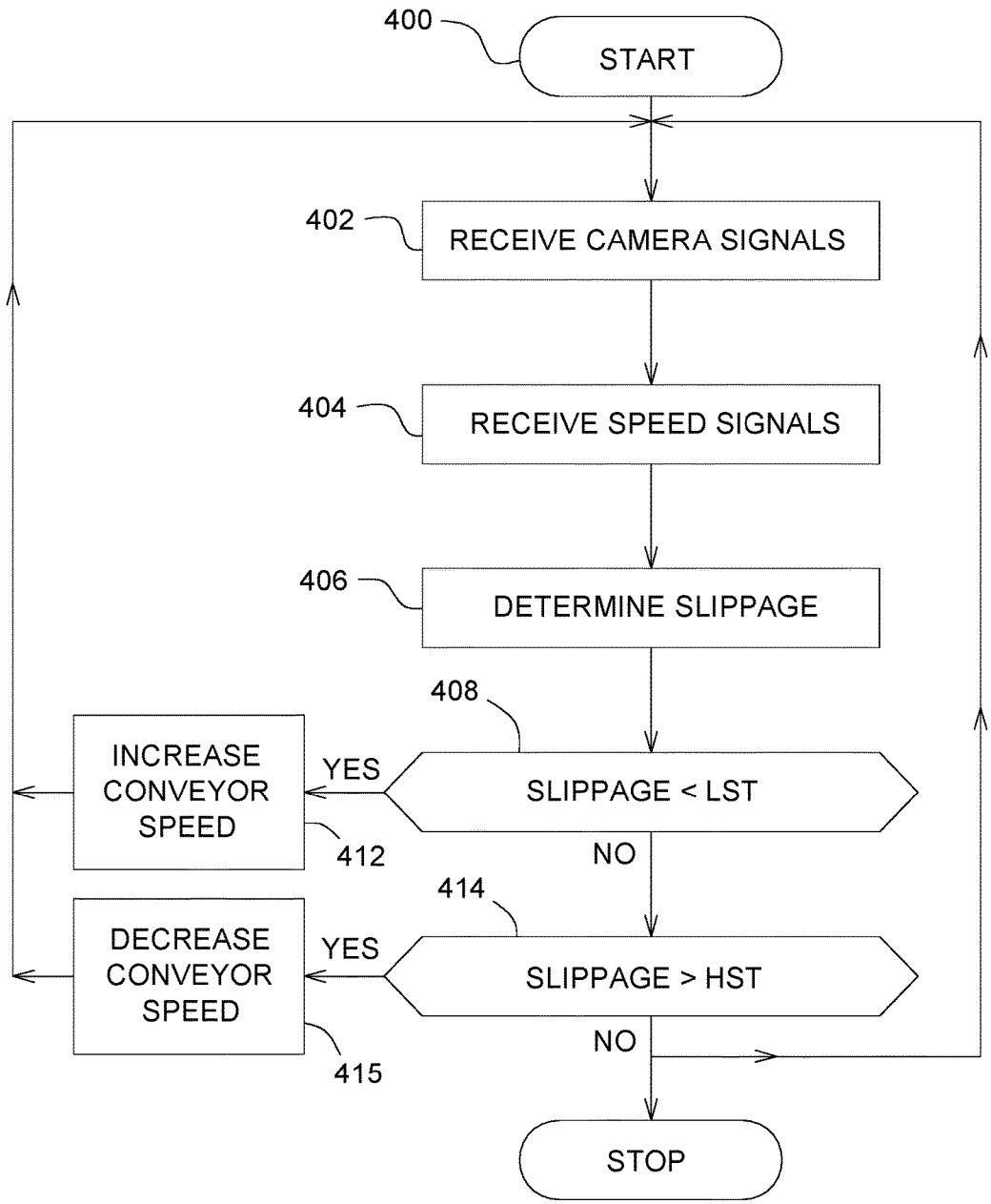
FIG. 4 shows a flowchart for an ECU of the control system.

FIG. 4 indicates the operations performed by the ECU 136 in order to control the slippage of the crop mats with respect to the conveyors.

In step 400, the process starts.

In step 402, the ECU 136 receives the signals from the cameras 128, 130 and determines the speed of the crop mats on the left side conveyor 111 and the right side conveyor 112.

In step 404, the ECU 136 receives the signals from the speed sensors 132, 134 and determines the speed of the left side conveyor 111 and the right side conveyor 112.

In step 406, the ECU 136 determines the slippage of the crop mat on the left side conveyor 111 by subtracting the speed of the left side conveyor 111 from the speed of the crop mat on the left side conveyor 111. The ECU 136 also determines the slippage of the crop mat on the right side conveyor 112 by subtracting the speed of the right side conveyor 112 from the speed of the crop mat on the right side conveyor 112.

In step 408, the ECU 136 compares the slippage on the left side conveyor 111 and the right side conveyor 112 with a predetermined low slippage threshold ["LST"] (e.g. 2% slip). If the slippage of a conveyor is below this threshold, the ECU 136 continues to step 412.

In step 412, the ECU 136 increases the speed of the conveyor that is below the low slippage threshold by sending a speed increase signal to the appropriate motor speed controller 138, 140. This has the effect of increasing the speed of the conveyor that is below the low slippage threshold.

In step 414, the ECU compares the slippage on the left side conveyor 111 and the right side conveyor 112 with a predetermined high slippage threshold ["HST"](e.g. 8% slip). If the slippage of the conveyor is above this threshold, the ECU continues to step 416.

In step 416, the ECU 136 decreases the speed of the conveyor that is above the high slippage threshold by sending speed decreased signal to the appropriate motor speed controller 138, 140. This has the effect of decreasing the speed of the conveyor that is above the high slippage threshold.

If the slippage of each conveyor is neither below the low slippage threshold nor above the high slippage threshold, the ECU 136 leaves the speed of the conveyors unchanged and loops back to start at step 402.

In this manner, the ECU 136 maintains the slippage on each conveyor belt within a predefined range that is neither so slow it permits the conveyors to become overburdened with too think of a crop mat nor so high it damages the crop mat and releases excessive grain onto the conveyor belts.

The claims below define the invention. The description and figures above are provided to enable one skilled in the art to make and use the invention. Other ways of making and using the invention will be apparent to those skilled in the art.

The invention claimed is:

1. In a draper harvesting head having a frame, a left side conveyor supported on the frame, a right side conveyor supported on the frame, a central conveyor supported on the frame and disposed between the left side conveyor and the right side conveyor, and a reciprocating knife fixed to the front of the frame and extending laterally across the frame, a method of controlling slippage between an endless conveyor belt of one of the left side conveyor and the right side conveyor and a crop mat carried on the endless conveyor belt, the method comprising the steps of:
    electronically determining a speed of the endless conveyor belt;
    electronically determining a speed of the crop mat;
    electronically comparing a difference in the speed of the endless conveyor belt and the speed of the crop mat with a first threshold speed difference; and
    electronically changing the speed of the endless conveyor belt based upon the step of comparing.

2. The method of controlling slippage of claim 1, wherein the draper harvesting head has a speed sensor coupled to the endless conveyor belt to provide a signal indicative of the speed of the endless conveyor belt, and further wherein the step of electronically determining a speed of the endless conveyor belt comprises a step of electronically reading the speed sensor.

3. The method of controlling slippage of claim 1, wherein the draper harvesting head has a camera disposed to view the crop mat, and further wherein the step of electronically determining a speed of the crop mat comprises a step of imaging the crop mat with the camera.

4. The method of controlling slippage of claim 3, wherein the step of electronically determining a speed of the crop mat further comprises a step of calculating the speed of the crop mat from a sequence of images taken by the camera.

5. The method of controlling slippage of claim 1, wherein the draper harvesting head has a motor drivingly coupled to the endless conveyor belt, and further wherein the step of electronically changing the speed of the endless conveyor belt comprises a step of electronically changing the speed of the motor.

6. The method of controlling slippage of claim 1, further comprising the step of electronically comparing a difference in the speed of the endless conveyor belt and the speed of the crop mat with a second threshold speed difference.

7. The method of controlling slippage of claim 6, wherein the first threshold speed difference is less than the second threshold speed difference.

8. The method of controlling slippage of claim 1, wherein the step of electronically changing the speed of the endless conveyor belt based upon the step of comparing comprises a step of electronically increasing the speed of the endless conveyor belt when the difference in the speed of the endless conveyor belt and the speed of the crop mat is below the first threshold speed difference.

9. The method of controlling slippage of claim 1, wherein the step of electronically changing the speed of the endless conveyor belt based upon the step of comparing comprises a step of electronically decreasing the speed of the endless conveyor belt when the difference in the speed of the endless conveyor belt and the speed of the crop mat is above the first threshold speed difference.

* * * * *